UNITED STATES PATENT OFFICE.

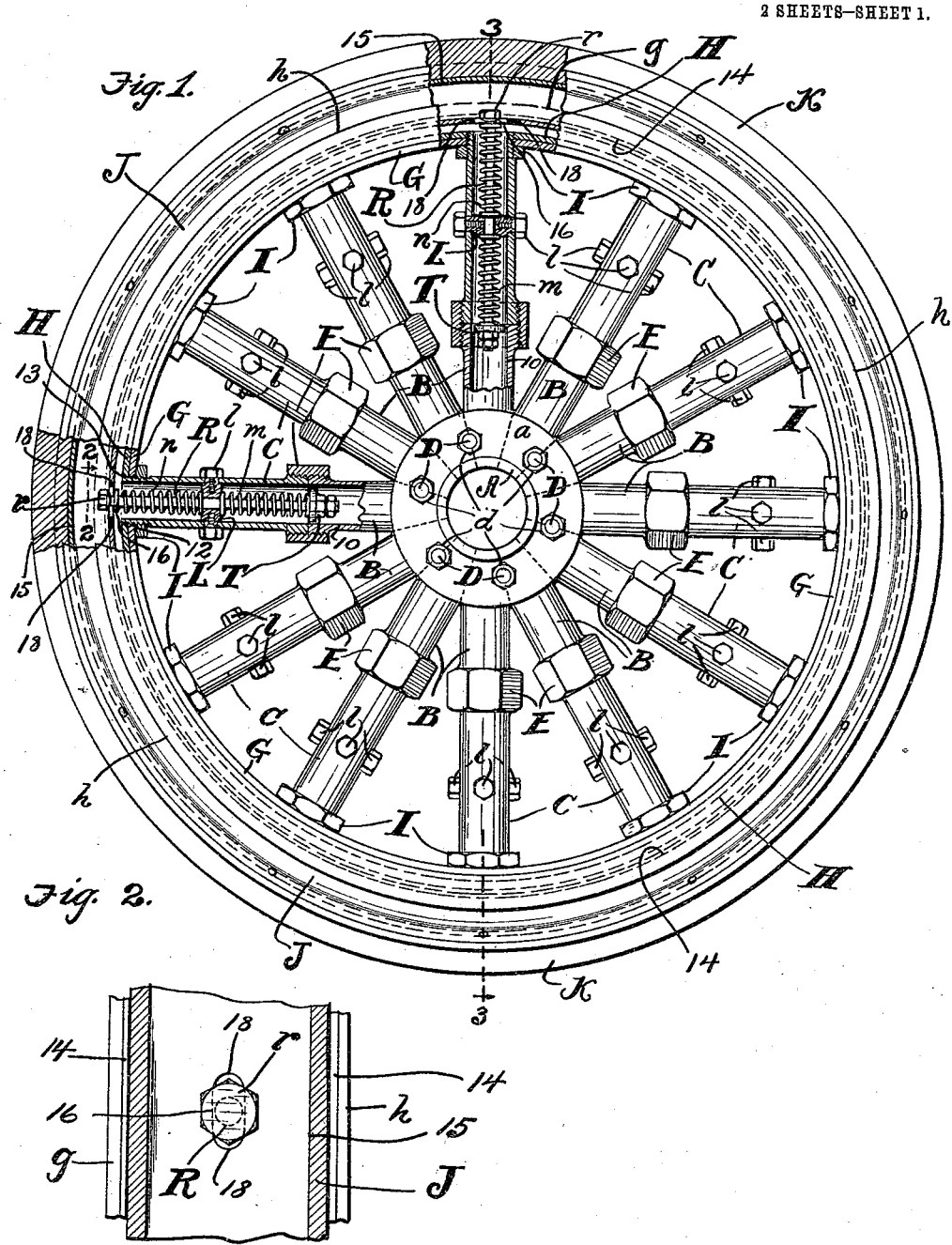

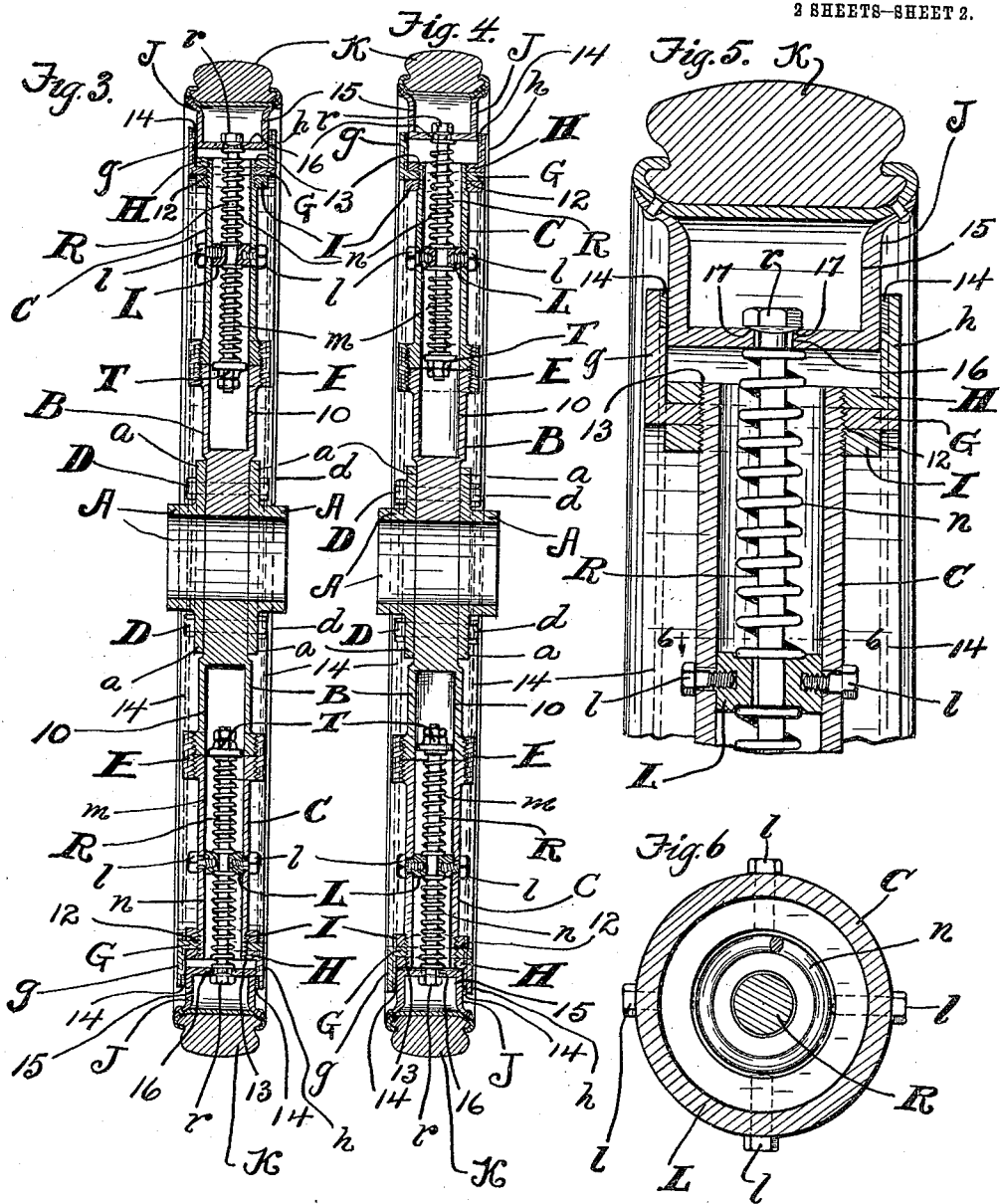

LOUIS B. LODGE, OF CUYAHOGA FALLS, OHIO.

VEHICLE-WHEEL.

1,004,667.      Specification of Letters Patent.      Patented Oct. 3, 1911.

Application filed September 3, 1909. Serial No. 516,016.

*To all whom it may concern:*

Be it known that I, LOUIS B. LODGE, a citizen of the United States of America, residing at Cuyahoga Falls, in the county of Summit and State of Ohio, have invented certain new and useful Improvements in Vehicle-Wheels; and I hereby declare the following to be a full, clear, and exact description of the invention, such as will enable others skilled in the art to which it pertains to make and use the same.

This invention relates to improvements in vehicle-wheels.

One object of this invention is to produce a vehicle-wheel which with a solid tire will run substantially as smoothly over a rough or uneven road as a vehicle-wheel having a pneumatic or inflated tire.

Another object is to cushion the tire at the outer end of each spoke of the wheel by two spiral springs arranged within and longitudinally of the said spoke and in line endwise and having bearing at their adjacent ends against opposite ends respectively of a block which is arranged within the said spoke and forms an abutment for the said ends of the springs which are connected at their other ends with the tire-holder.

With these objects in view, and to the end of facilitating the assemblage and separation of the component parts of the wheel, this invention consists in certain features of construction, and combinations of parts, hereinafter described, pointed out in the claim, and illustrated in the accompanying drawings.

In the said drawings, Figure 1 is a side view of a vehicle-wheel embodying my invention, and portions are broken away and in section in this figure to more clearly show the construction. Fig. 2 is a section taken along the line 2—2, Fig. 1, looking inwardly. Fig. 3 is a view largely in section taken along the line 3—3, Fig. 1, looking in the direction indicated by the arrow. Fig. 4 is a view corresponding with Fig. 3, except that in Fig. 4 the tire and tire-holder of the wheel are shown somewhat lifted as would be the case in running over or encountering a hump or other obstruction on the roadway. Fig. 5 is a sectional view showing a portion of Fig. 3 on a larger scale. Fig. 6 is a transverse section on line 6—6, Fig. 5, looking in the direction indicated by the arrow. Figs. 1, 3 and 4 are drawn on the same scale. Figs. 2 and 5 are drawn on the same scale but on a considerably larger scale than Figs. 1, 3 and 4, and Fig. 6 is drawn on a larger scale than Fig. 5.

The hub of my improved wheel is composed of two suitably spaced annular sections A and A which are arranged in line endwise. Each hub-section A is provided at its inner end and externally with an outwardly projecting annular flange $a$.

The spokes of the wheel are each composed of two sections B and C arranged in line endwise. The spokes are arranged radially of the wheel and attached to and spaced circumferentially of the hub.

Preferably the inner sections B of the spokes are snugly interposed between the flanges $a$ of the hub-sections A, and secured to the said flanges by suitably applied bolts D and nuts $d$.

Within the outer portion of the inner section B of each spoke is formed a chamber 10 which extends to the outer extremity of the said spoke-section. The outer end of the inner section B of each spoke is screw-threaded externally and engaged by a correspondingly internally screw-threaded sleeve E which is screwed onto the correspondingly externally screw-threaded inner end of the outer section C of the said spoke. The outer section C of each spoke is therefore removably attached to the inner section of the said spoke. The outer section C of each spoke is tubular and cylindrical in cross-section, and the space formed within and extending through the said spoke-section is in communication with the chamber 10 of the inner section of the said spoke.

The rim of my improved vehicle-wheel extends circumferentially of the wheel at the outer ends of and is attached to the spokes. The said rim is preferably composed of two overlapping metal rings or annular sections G and H which extend circumferentially of the wheel and are arranged the one within the other and concentrically relative to the hub.

The inner rim-section G is provided at each spoke with a screw-threaded hole 12 which is in registry with a correspondingly screw-threaded hole 13 formed in the outer rim-section H, and the said spoke has its outer section C externally threaded at its outer end and screwed into the rim-sections at the said holes. The rim-sections, and consequently the rim, are therefore removably secured to the spokes.

Nuts I are shown mounted on the outer spoke-sections C at the inner circumferentially extending surface of the wheel-rim.

The wheel-rim is provided externally with two outwardly projecting parallel laterally spaced flanges $g$ and $h$ which are formed on the rim-sections G and H respectively. The flanges $g$ and $h$ form a slideway for an annular tire-holder J to which the tire K is applied in any approved manner. The tire-holder is arranged concentrically relative to the rim and hub of the wheel and extends into the space formed between the flanges $g$ and $h$ and is shiftable independently of the wheel-rim in a vertical plane at a right angle to the axis of the wheel, and the said flanges are provided at their inner side with wear-rings 14 arranged next externally of the adjacent portion of the tire-holder.

The tire-holder J is provided interiorly with a chamber 15 which extends circumferentially of the tire-holder.

Within and centrally between the ends of the outer section C of each spoke is arranged a block L which is secured, preferably removably by suitably applied screws $l$, to the said spoke-section, which block forms an abutment for the adjacent ends of two spiral springs $m$ and $n$ which are arranged within and longitudinally of the said spoke-section at the inner end and outer end respectively of the said block. A bolt has its shank R arranged within and longitudinally of the said spoke-section C and extends loosely through the said block L. The said shank extends a suitable distance inwardly beyond the inner end of the said block and extends from the outer end of the said block outwardly to and loosely through the inner circumferentially extending wall of the chamber 15 in the tire-holder. That is, the said wall is provided adjacent the outer end of each spoke with a bolt-hole 16 through which the shank R of a bolt extends, and the head $r$ of the said bolt overlaps the inner surface of the said wall, as at 17, (see Fig. 5) between the said bolt-hole and the sides of the tire-holder, but the said bolt-hole is elongated circumferentially of the tire-holder, as shown at 18 in Figs. 1 and 2, to prevent interference with the shifting of the tire-holder in a vertical plane by the said bolt when the spoke into which the said bolt extends is arranged in a horizontal or diagonal plane during the rotation of the wheel.

On the shank R of each bolt, at or in suitable proximity to the free end of the shank, is mounted a nut T, and a spiral spring $m$ is mounted and confined on the said shank between the said nut and the inner end of the block L through which the said shank extends. A spiral spring $n$ is mounted and confined on the said shank between the outer end of the said block and the tire-holder. The springs $m$ and $n$ in each spoke correspond in dimensions and are normally in condition to be placed under tension by a shifting of the tire-holder J vertically independently of the hub and connected spokes and wheel-rim.

By the construction hereinbefore described it will be observed that the tire-holder J is operatively connected with both of the springs $m$ and $n$ within each spoke, and obviously when the tire and tire-holder are lifted or shifted vertically independently of the wheel-rim, as shown in Fig. 4, by pressure exerted against the tread or periphery of the tire opposite the outer end of any spoke by a hump or obstruction on the roadway, the spring $n$ in the said spoke is compressed and thereby placed under tension and the inner spring $m$ in the said spoke is stretched inwardly toward the axis of the wheel and thereby placed under tension. It will be observed also that when the tire-holder is lifted or shifted vertically independently of the wheel-rim by pressure exerted against the tread or periphery of the tire opposite the outer end of any spoke the inner spring in the uppermost spoke of the wheel is compressed and thereby placed under tension and the outer spring in the last-mentioned spoke is pulled upon at its outer end and thereby stretched and placed under tension. It is obvious therefore that the springs $m$ and $n$ act to retain the tire-holder J concentric relative to the wheel-rim. It will also be observed that all of the springs in the spokes arranged above or below the axis of the wheel more or less operate to cushion the tire when the tire-holder is shifted in a vertical plane.

What I claim is:—

A vehicle-wheel comprising a hub; spokes attached at their inner ends to the hub and arranged radially, which spokes are tubular from their outer extremities a suitable distance inwardly; a rim extending circumferentially of the wheel at the outer ends of and attached to the spokes, which rim is concentric relative to the hub; a tire; a tire-holder extending circumferentially of and concentric relative to the rim and shiftable vertically in a plane arranged at a right angle to the axis of the wheel, said tire-holder having an interior chamber extending circumferentially of the tire-holder, which chamber has its inner circumferentially extending wall provided adjacent each spoke with a bolt-hole which is elongated circumferentially of the tire-holder; a bolt having its shank arranged within and longitudinally of the tubular portion of each spoke and extending through the adjacent bolt-hole in the tire-holder, which bolt has its head overlapping the inner surface of the inner circumferentially extending wall of the aforesaid chamber between the said bolt-hole and the side walls of the chamber, and a spiral spring mounted and confined on the said shank and acting to retain the tire-holder concentric relative to the wheel-rim.

In testimony whereof, I sign the foregoing specification, in the presence of two witnesses.

LOUIS B. LODGE.

Witnesses:
C. H. DORER,
B. C. BROWN.

Copies of this patent may be obtained for five cents each, by addressing the "Commissioner of Patents, Washington, D. C."